United States Patent [19]
Lee

[11] Patent Number: 5,628,040
[45] Date of Patent: May 6, 1997

[54] FILM TRANSFER DEVICE USED IN A CAMERA

[75] Inventor: Sang-geol Lee, Kyeongsangnam-do, Rep. of Korea

[73] Assignee: Samsung Aerospace Industries, Ltd., Kyeongsangnam-do, Rep. of Korea

[21] Appl. No.: 579,482

[22] Filed: Dec. 27, 1995

[30] Foreign Application Priority Data

Dec. 27, 1994 [KR] Rep. of Korea ............... 94-37466

[51] Int. Cl.$^6$ ..................... G03B 1/24; G03B 1/40
[52] U.S. Cl. ..................... 396/396; 396/411; 396/413
[58] Field of Search ........................ 396/396, 395, 396/411, 413, 401, 410

[56] References Cited

U.S. PATENT DOCUMENTS

| | | | |
|---|---|---|---|
| 3,641,897 | 2/1972 | Fujimoto | 396/396 |
| 4,222,651 | 9/1980 | Urano et al. | 396/413 |
| 4,522,477 | 6/1985 | Iwashita et al. | 396/413 |
| 4,589,604 | 5/1986 | Yagi et al. | 396/411 |
| 5,434,635 | 7/1995 | Goo | 396/410 |

*Primary Examiner*—A. A. Mathews
*Attorney, Agent, or Firm*—Finnegan, Henderson, Farabow, Garrett & Dunner L.L.P.

[57] ABSTRACT

A film transfer device of a camera, which consists of a charging means for controlling one frame transfer of a film. The charging means is engaged with a winding part and a rewind spindle RS. A sprocket is designed to rotate independently from the winding part and the rewind spindle RS. A second clutch means is provided to compensate for the speed difference between the sprocket and the winding part on film winding or between the sprocket and the rewind spindle on film rewinding.

6 Claims, 5 Drawing Sheets

FILM TRANSFER DEVICE USED IN A CAMERA

BACKGROUND OF THE INVENTION

The present invention concerns a camera, and more particularly a film transfer device used in a camera.

Generally, there are two kinds of cameras, of which one is manually operated for loading a film on a take-up spool, and the other automatically operated by means of a drive means such as a motor. Referring to FIG. 8, the drive means includes a motor 50, a planetary gear part 51 connected to the motor, a winding part 52 engaged with the planetary gear part 51, a charging part 53 intermittently engaged with the planetary gear part 51, and a rewind part 54 intermittently engaged with the planetary part 51.

The film is wound one by frame (interval) at a time according to the rotation of the motor 50. The rotation of the motor 50 causes the planetary gear part 51 to engageably rotate with the charging part 53 to operatively work a charging lever (not shown). Simultaneously with the working of the charging lever is rotated the winding part 52 to wind the film on the take-up spool (not shown), and the motor 50 is stopped at one frame advanced position for transferring the film by one frame. The rewind part 54 is driven to rewind the film to the cartridge. To this end, the motor 50 is reversely rotated to cause the planetary gear part 51 to be engaged with the rewind part 54 to rotate a rewind spindle (now shown) for rewinding the film to the cartridge.

As described above, since the winding part 52 has the rewind part 54 and the charging part 53 separately mounted, it is intended to prevent the slow down of the rewind speed when the winding part 52 simultaneously drives the charging part 53 and the rewind part 54, and, further, to secure the winding of the film on the film winding parts. However, the separate mounting of the winding and the rewind part 52 and 54 requires a plurality of idle gears to adjust the speed reduction ratio, thereby complicating the structure.

SUMMARY OF THE INVENTION

It is an object of the present invention to provide a simple structure for a film transfer device of a camera.

According to the present invention, a film transfer device of a camera comprises a charging means for controlling one frame transfer of a film. The charging means is engaged with a winding part and a rewind spindle RS. A sprocket is designed to rotate independently from the winding part and the rewind spindle RS. A second clutch means is provided to compensate for the speed difference between the sprocket and the winding part on film winding or between the sprocket and the rewind spindle on film rewinding.

The present invention will not be described more specifically with reference to the drawings attached only by way of example.

BRIEF DESCRIPTION OF THE ATTACHED DRAWINGS

DETAILED DESCRIPTION OF PREFERRED EMBODIMENTS

Figure 1:
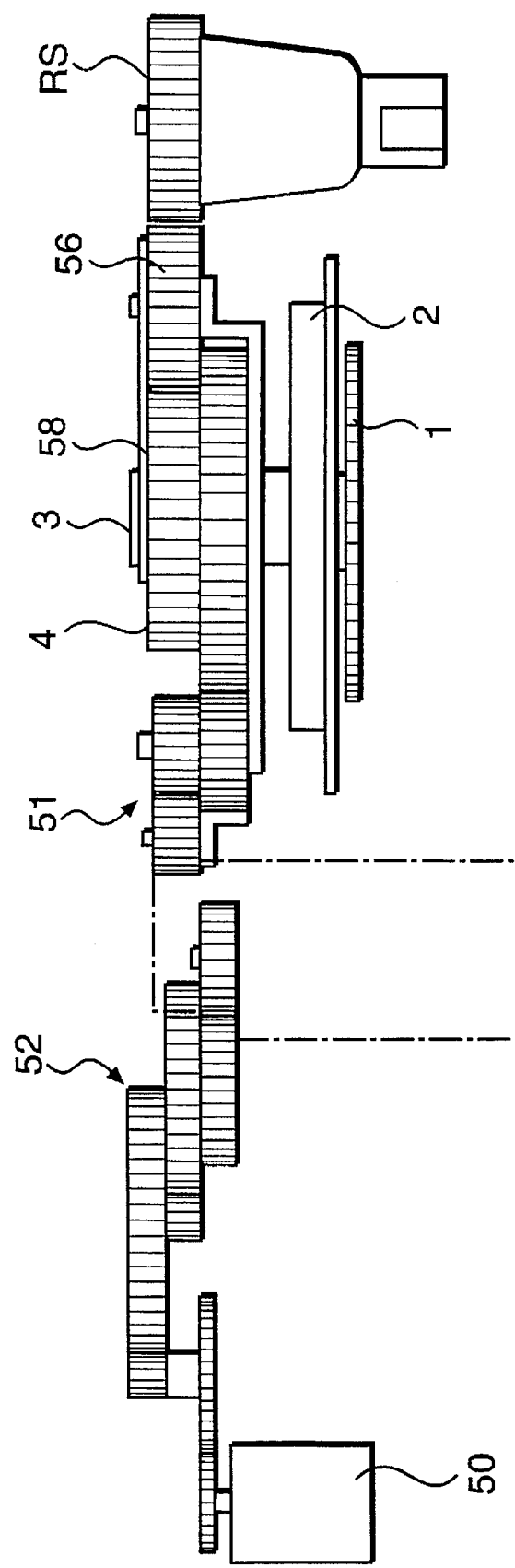
FIG. 1 is a side elevation of an film transfer device of a camera according to the present invention.

Referring to FIG. 1, a winding part 52 is engaged with a motor 50. A charging part is connectably disposed between the winding part 52 and a rewind spindle RS to control one frame transfer of a film. The rotating speed of a sprocket 1 is to compensate for the speed difference between the winding part 52 and the rewind spindle RS. The charging part is separated from the rewind spindle RS while rotating in a forward direction and engaged with the rewind spindle RS while rotating in a reverse direction.

Figure 2:
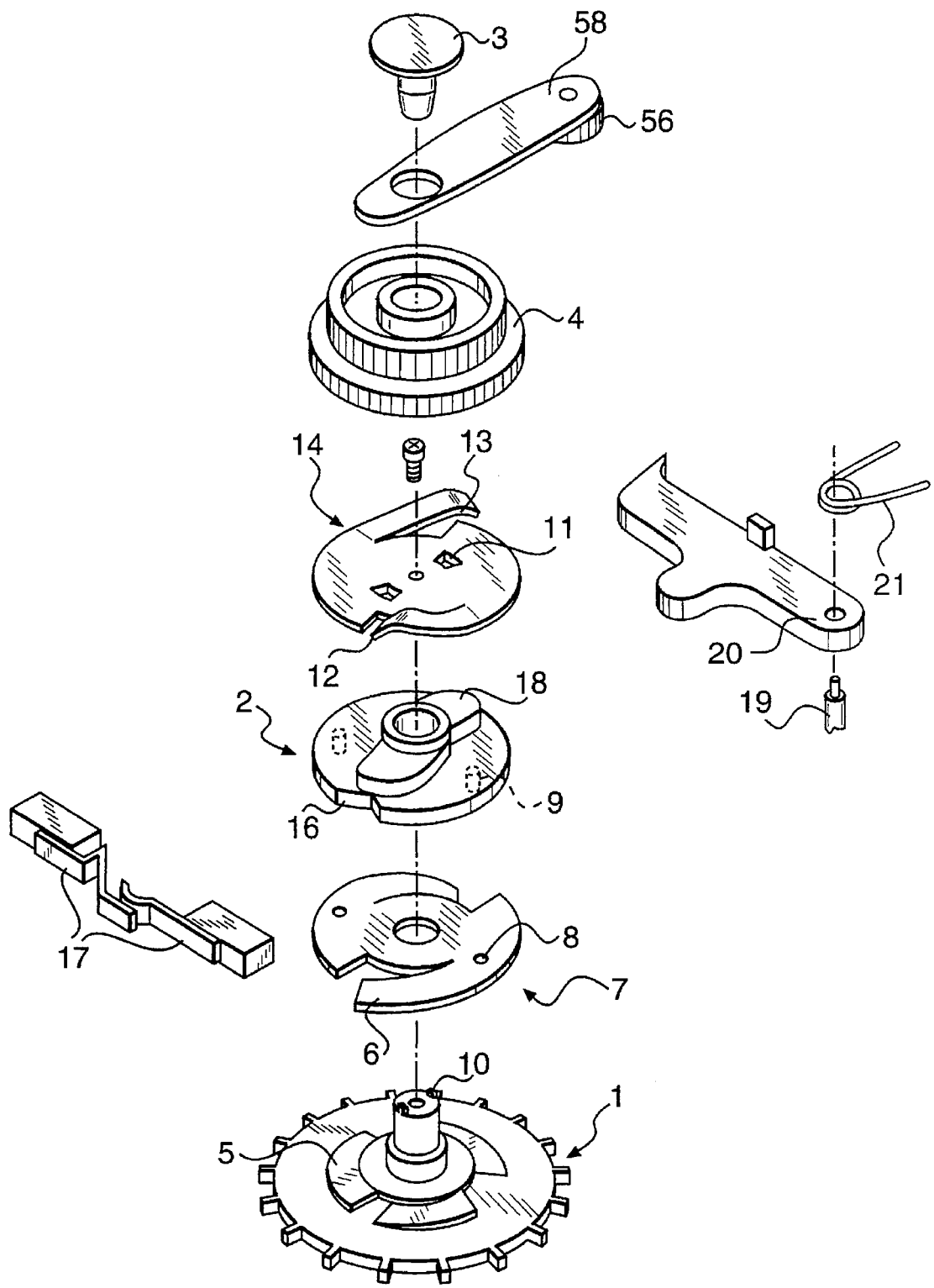
FIG. 2 is an exploded view of the charging device shown in FIG. 1.
Figure 3:
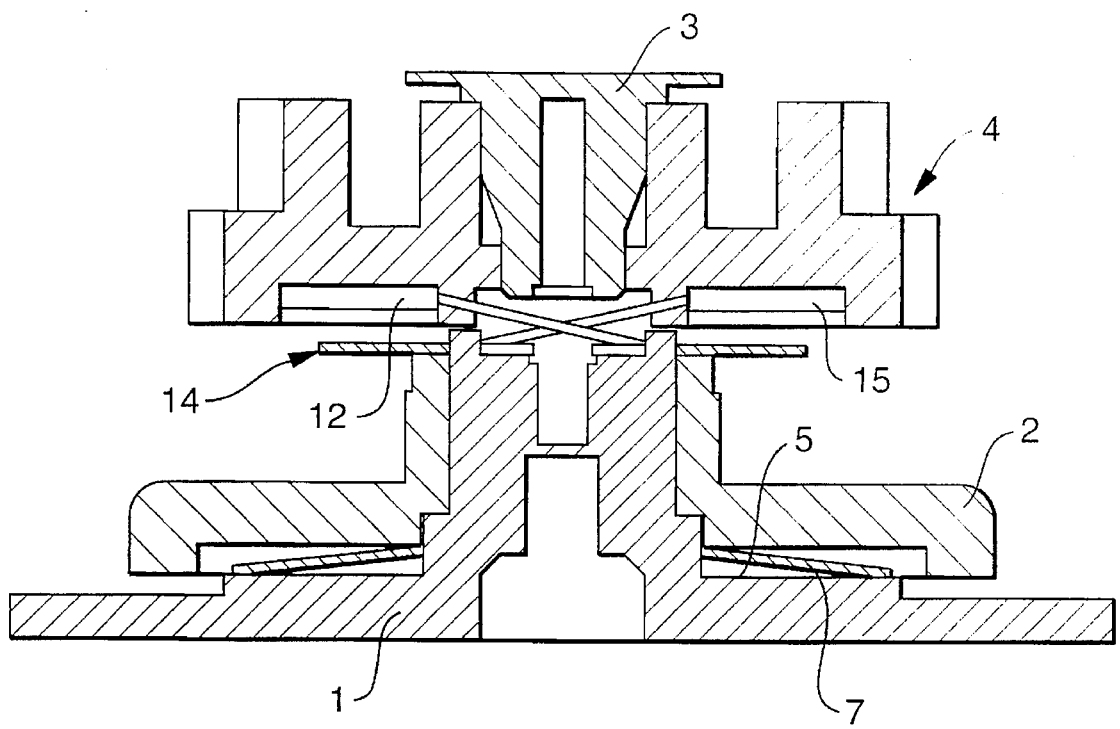
FIG. 3 is a cross sectional view for schematically illustrating the charging device of FIG. 2 assembled.
Figure 4:
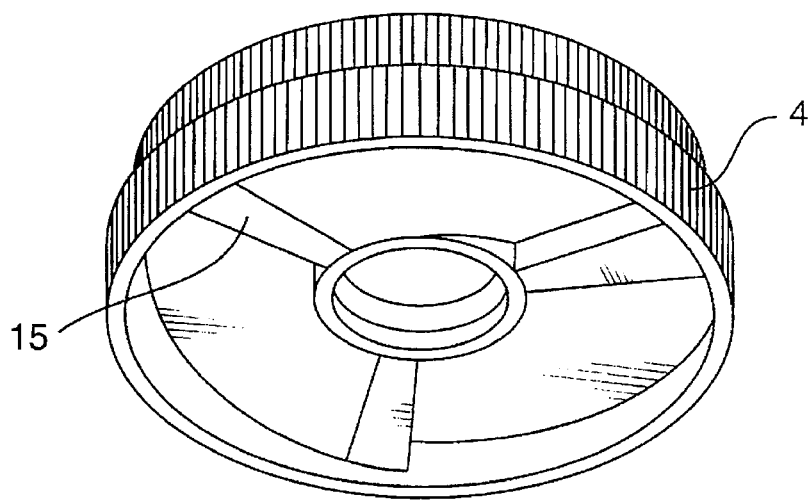
FIG. 4 is a bottom view of the charging gear.

The charging part, as collectively shown in FIGS. 1–3, preferably includes a charging cam 2 connected with the sprocket 1 and a first clutch part, and a charging gear 4 associated with a winding base 3 having a shaft 58 with a gear 56 attached thereto. Also connected with the charging part 4 are the sprocket 1, a second clutch part, the winding part 52, and a planetary gear part 51. The first clutch part is preferably composed of a first cam 5 formed on the upper surface of the sprocket 1, a first resilient plate 7 with a pair of cut flaps 6 resiliently contacting the first cam 5, and a pair of perforations 8 formed in the first resilient plate 7 to hold a pair of projections 9 formed on the charging cam 2. The first cam 5 is interlocked with the first resilient plate 7 on the forward rotation of the sprocket 1. The second clutch part is preferably composed of a second resilient plate 14 and a second cam 15. The second resilient plate has a pair of holes 11 respectively receiving a pair of projections 10 formed on the shaft of the sprocket, so that it may be rotated integrally with the sprocket 1. The second resilient plate 14 also has a pair of cut flaps 13 with an end bend 12. The second cam 15 is provided on the bottom surface of the charging gear 4, so that the second resilient plate 14 may be interlocked with or slip on the charging gear 4 depending on whether the forward or reverse rotation is made.

A one-step frame device provided in the charging cam 2 is preferably composed of a third cam 16 formed on the perimeter of the charging cam 2, a one-step frame switch 17, a semicircular fourth cam 18 formed on the upper surface of the charging cam 2, and a charging lever 20 mounted by means of a hinge to contact the fourth cam 18. The charging lever 20 is resiliently supported by means of a spring to press the fourth cam 18. The sprocket 1 is rotatably mounted on a boss now shown.

Figure 5:
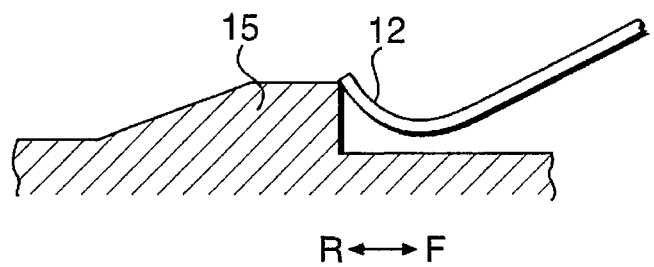
FIG. 5 is an enlarged partial view for illustrating the working of a second clutch.
Figure 6:
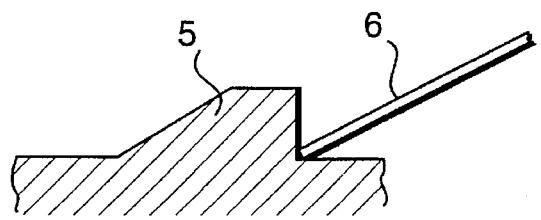
FIG. 6 is an enlarged partial view for illustrating the working of a first clutch.
Figure 8:
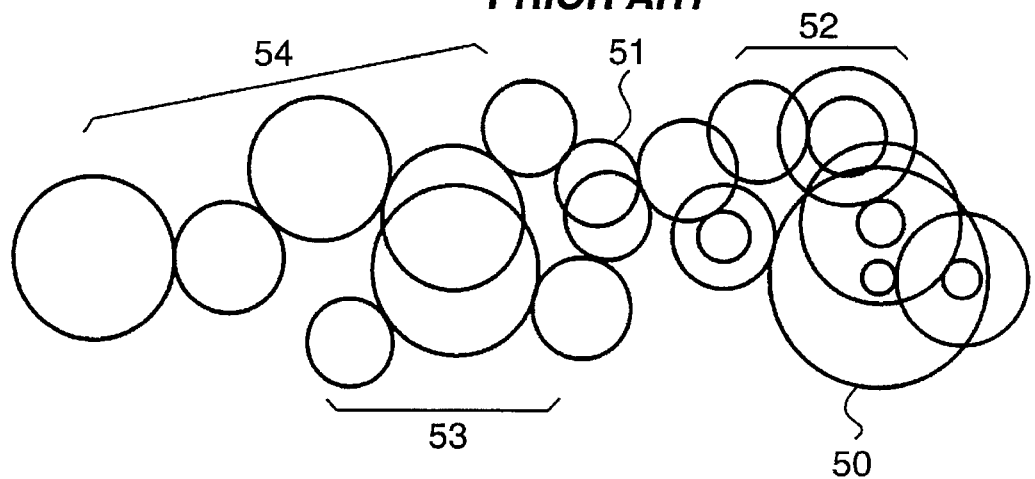
FIG. 8 is a schematic view for illustrating the structure of a conventional film transfer device used in a camera.
Figure 7A:
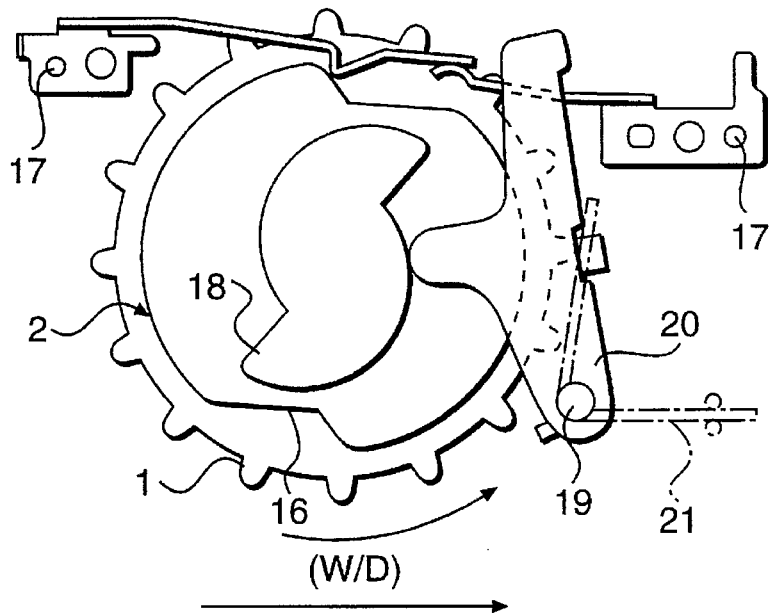
FIG. 7A is a side elevation for illustrating the contacting phase of one frame switch on a forward rotation.
Figure 7B:
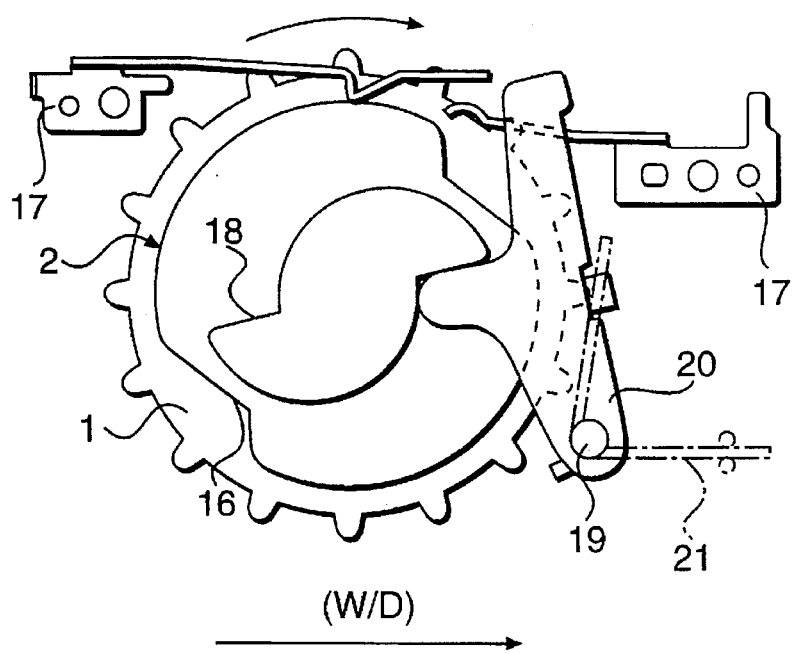
FIG. 7B is a side view for illustrating the release phase of one frame switch on a reverse rotation.

In operation, when the back cover (not shown) of a camera is opened, a film is loaded, and the back cover is consequently closed, the motor 50 is activated by a switch (not shown) to rotate the winding part 52 to wind the film, and the charging gear 4, which is engaged with the winding part 52, is also rotated. Then, as shown in FIG. 5, the second cam 15 of the charging gear 4 is rotated interlockedly with the cut flaps 13 of the second resilient plate 14, resulting in the rotation of the sprocket 1. When the sprocket 1 is rotated, since the first cam 5 of the sprocket 1 is interlocked with the cut flaps 6 of the first resilient plate 7, as shown in FIG. 6, the first resilient plate 7 is also rotated, and the charging cam 2, which projections 9 formed thereon are engaged with perforations 8 formed in the plate 7, is also rotated. When the charge cam 2 is rotated, as shown in FIGS. 7A and 7B, one-step frame switch 17 becomes separated from the third cam 16 and removed from contact therewith by the third cam 16, and the fourth cam 18 causes the charging lever 20 to rotate to charge the shutter (not shown). When the charging cam 2 continues to rotate to cause the frame switch 17 again to be positioned to contact the third cam 16, so that the motor is stopped to transfer the film by one frame. The third cams 16 are formed with an interval of 180° to rotate the sprocket 1 by exactly one frame, and the charging lever 20 returns to the original position by the spring 21 and stands by for the next rotation.

When the sprocket 1 is rotated at a speed greater than that of the winding part 52, the charging gear 4 rotates more slowly than the sprocket 1 with respect to the position of the second resilient plate 14, so that the cut flaps 13 slip over the second cam 15. Namely, if the second resilient plate 14 slips over the charging gear 4, the sprocket 1 cannot transfer the film subjected to a given pressure by the pressure plate (not shown) mounted on the back cover of the camera only by the rotational force of the sprocket 1, so that the film is transferred according to the rotational speed of the winding part 52, thus preventing the winding error of the film. In addition, if the sprocket 1 is loaded excessively, the first clutch 14 slips over the charging gear 4 with the help of end bends 12, so that the winding part 52 is prevented from receiving an excessive force, thus protecting the gear.

As explained above, the film is completely used to take pictures, the motor is reversely rotated by activating a rewind switch to rotate the charging gear 4, when the charging gear 4 is rotated, it causes the planetary gear part 51 to engage with the rewind spindle RS, thus rotating the rewind spindle RS at a given speed. With respect to the relationship between the first resilient plate 7 and the sprocket, as shown in FIG. 6, when winding the first cam 5 of the sprocket 1 pushes the cut flaps 6 of the first resilient plate 7 to rotate. Further, when rewinding, since the direction is opposite, the first resilient plate 7 and the first cam 5 of the sprocket 1 are rotated by the frictional force therebetween. Hence, as shown in FIG. 7B, since the one-step frame switch 17 is separated while the above rotate by the frictional force, when the fourth cam 18 contacts the charging lever 20, the rotation is stopped, which is maintained until the rewinding is completed.

At this time, since the rotational speed of the rewind spindle RS should be greater than that of the charging gear 4 in order to secure a smooth rewinding, a constant speed ratio is provided via the planetary gear part 51, so that the film is quickly wound by the rewind spindle RS and the sprocket 1 is rotated more rapidly than the charging gear 4. Consequently, the rotational speed of the second resilient plate 14 becomes different from that of the charging gear 4. Namely, since the second resilient plate 14 is rotated faster than the charging gear 4, the end bends 12 slip over the second cam 15. Thus, the speed difference between the rewind spindle RS and the charging gear 4 is compensated.

After retracting the rewound film, the planetary gear part 51 is separated from the rewind spindle RS in order to load a new film. To this end, when the back cover of the camera is opened and film is loaded, a sensing switch (not shown) automatically turns on the motor 50 to rotate the charging gear 4 as shown in FIG. 7A, so that the forward rotational position is resumed to load the new film. Thus, the single charging gear compensates for the rotational speed difference occurring in the forward and the reverse rotation.

What is claimed is:

1. A film transfer device for a camera, comprising:

a winding part;

a rewinding spindle;

a sprocket, rotatably coupled to said winding part and said rewinding spindle;

charging means, rotatably coupled to said winding part and said rewinding spindle, for controlling one frame advance of a film; and first clutch means, coupled to said sprocket and said charging means, for equating the speed of rotation between said sprocket and said winding part when the film is being wound and for equating the speed of rotation between said sprocket and said rewinding spindle when the film is rewound.

2. The film transfer device of claim 1, wherein said charging means comprises:

a charging cam coupled to said sprocket through a second clutch means;

a charging gear coupled to said charging cam through said second clutch means, engaged with said winding part, and having a planetary gear part; and a winding base coupled to said charging gear.

3. The film transfer device of claim 2, wherein said charging cam includes one or more projections extending therefrom, and wherein said first clutch means comprises:

a first cam on said sprocket; and a first resilient plate resiliently contacting said first cam, said first resilient plate having one or more perforations for receiving said one or more projections of said charging cam.

4. The film transfer device of claim 2, wherein said sprocket includes one or more projections extending therefrom, and wherein said second clutch means comprises:

a second resilient plate having one or more perforations for engaging said one or more projections of said sprocket to rotate said sprocket; and a second cam on said charging gear.

5. The film transfer device of claim 2, wherein said charging cam includes means for transferring the film by one frame.

6. The film transfer device of claim 5, wherein said means for transferring the film by one frame includes a third cam on said charging cam and a switch for contacting said third cam.

\* \* \* \* \*